(12) United States Patent
Proctor

(10) Patent No.: US 7,180,897 B1
(45) Date of Patent: Feb. 20, 2007

(54) TELECOMMUNICATIONS SYSTEMS

(75) Inventor: Richard J Proctor, Wimborne (GB)

(73) Assignee: Ericsson AB, Stockholm (SE)

( * ) Notice: Subject to any disclaimer, the term of this patent is extended or adjusted under 35 U.S.C. 154(b) by 0 days.

(21) Appl. No.: 09/432,319

(22) Filed: Nov. 2, 1999

(30) Foreign Application Priority Data

Nov. 6, 1998 (GB) ................................. 9824323.1

(51) Int. Cl.
*H04L 12/28* (2006.01)
(52) U.S. Cl. ............................. 370/395.1; 370/395.52; 370/395.61; 370/395.64
(58) Field of Classification Search ................ 370/352, 370/351, 353, 355, 357, 389, 395.1, 395.4, 370/396, 395.41, 395.52, 395.6, 395.61, 370/395.64, 400, 401, 356, 412, 411, 419, 370/399, 229, 231, 230, 428, 399.21, 230.1, 370/466, 252; 379/207, 219, 220, 221, 235; 709/224; 710/52, 53, 54, 55, 56, 2
See application file for complete search history.

(56) References Cited

U.S. PATENT DOCUMENTS

| | | | |
|---|---|---|---|
| 5,483,527 A * | 1/1996 | Doshi et al. ................. 370/399 |
| 5,623,491 A * | 4/1997 | Skoog ......................... 370/397 |
| 5,920,562 A * | 7/1999 | Christie et al. ........... 370/395.5 |
| 5,940,393 A * | 8/1999 | Duree et al. ................. 370/392 |
| 6,002,757 A * | 12/1999 | Williams et al. ......... 379/201.01 |
| 6,169,735 B1 * | 1/2001 | Allen et al .................. 370/352 |
| 6,243,374 B1 * | 6/2001 | White et al. ................. 370/352 |
| 6,243,377 B1 * | 6/2001 | Phillips ....................... 370/354 |
| 6,282,194 B1 * | 8/2001 | Cheesman ................... 370/356 |
| 6,335,936 B1 * | 1/2002 | Bossemeyer ................ 370/420 |
| 6,345,048 B1 * | 2/2002 | Allen, Jr. .................... 370/352 |
| 6,370,149 B1 * | 4/2002 | Gorman ...................... 370/419 |
| 6,449,278 B2 * | 9/2002 | Rose ........................... 370/397 |
| 6,466,578 B1 * | 10/2002 | Mauger et al. ........... 370/395.3 |
| 6,504,838 B1 * | 1/2003 | Kwan ......................... 370/352 |
| 6,542,498 B2 * | 4/2003 | Socaciu ...................... 370/352 |

FOREIGN PATENT DOCUMENTS

| | | |
|---|---|---|
| EP | 0 840 530 A2 | 5/1998 |
| GB | 2 276 518 A | 9/1994 |
| GB | 2 313 018 A | 11/1997 |
| WO | WO 97/27692 | 7/1997 |
| WO | WO 98/02012 | 1/1998 |
| WO | WO 98/24262 | 6/1998 |
| WO | WO 98/44703 | 10/1998 |

OTHER PUBLICATIONS

Jeong, Voice over ATM: Issues and Challenges, Georgia Institute of Technology, pp. 1-60, Aug. 1997.*
General DataComm, Adapting Voice for ATM Networks: A Comparison of AAL1 Versus AAL2, pp. 1-12, 1997.*
*User Multiplexing in RTP Payload Between IP Telephony Gateways*, IETF Internet Draft, B. Subbiah, et al., pp. 1-7.

* cited by examiner

*Primary Examiner*—Frank Duong
(74) *Attorney, Agent, or Firm*—Kirschstein, et al.

(57) ABSTRACT

A telecommunications system comprising one or more cross-connects and a plurality of telephone exchanges wherein two or more of the telephone exchanges are arranged to communicate with each other via the one or more routers and an adapter for providing the telephone exchanges with a means of inter-communication via the one or more routers wherein the adapter converts traffic between packetised and non-packetised form.

14 Claims, 6 Drawing Sheets

TELECOMMUNICATIONS SYSTEMS

BACKGROUND OF THE INVENTION

The present invention relates to telecommunications systems such as telephone networks comprising a plurality of interconnected telephone exchanges and communication therebetween.

Conventional telephone networks are fully-meshed in that each trunk exchange has a direct connection to every other trunk exchange. Traffic levels in telephone networks are increasing, leading to a continued need to increase the capacity of such networks. To achieve this, exchanges need to be enlarged and new exchanges installed. In fully-meshed networks, a significant number of additional network interconnections are needed with each new exchange, leading to further increases in the number of ports needed per exchange. This results in less efficient networks with costs per unit of traffic increasing.

SUMMARY OF THE INVENTION

By using the present invention it is possible to provide a more efficient and more easily configurable network.

The present invention provides a telecommunications system comprising one or more nodes and a plurality of telephone exchanges wherein two or more of the telephone exchanges are arranged to communicate with each other via the one or more nodes; wherein communication via the one or more nodes is in the form of packets; wherein the one or more nodes comprise routers.

In a further embodiment the present invention provides a telecommunications system wherein communication via the one or more routers uses internet protocol (IP).

The present invention also provides an adapter for providing the above telephone exchanges with a means of inter-communication of traffic via the one or more nodes wherein the adapter comprises means for converting the traffic between packetised and non-packetised form.

BRIEF DESCRIPTION OF THE DRAWINGS

Embodiments of the invention will now be described by way of example with reference to the drawings in which.

DETAILED DESCRIPTOIN OF THE PREFERRED EMBODIMENTS

Figure 1:
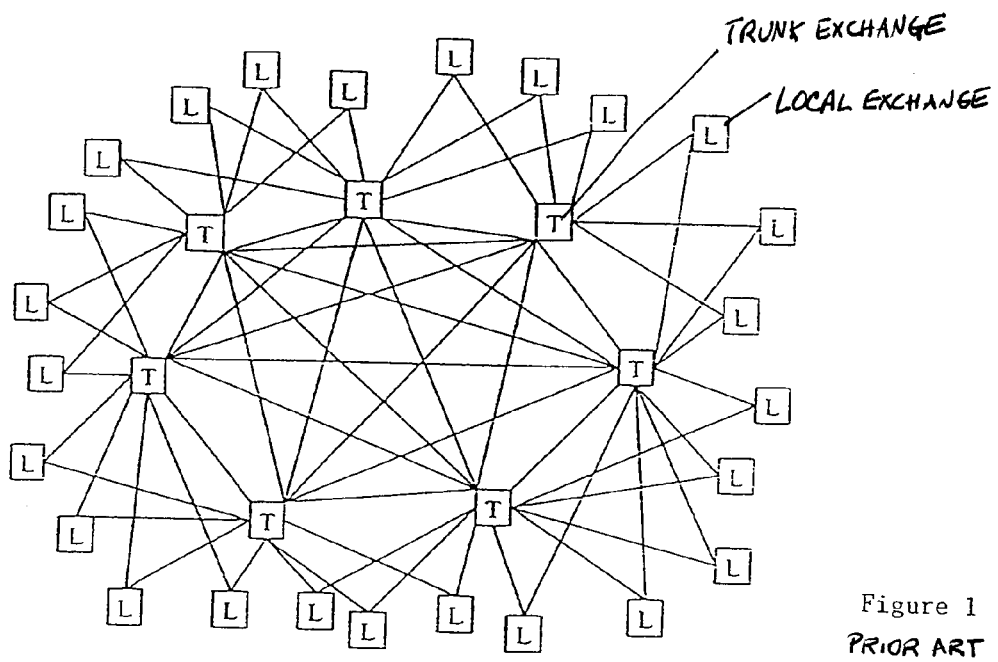
FIG. 1 shows in block diagram form a typical, conventional, large telecommunications network of the prior art.

Turning to FIG. 1 a typical, conventional, large telephone network comprises a number of local exchanges L interconnected via trunk exchanges T. Each local exchange L is connected to two (or more) trunk exchanges T, which are fully-meshed. In current networks this fully-meshed trunk interconnect typically uses mainly plesiochronous digital hierarchy (PDH) transmission.

Figure 2:
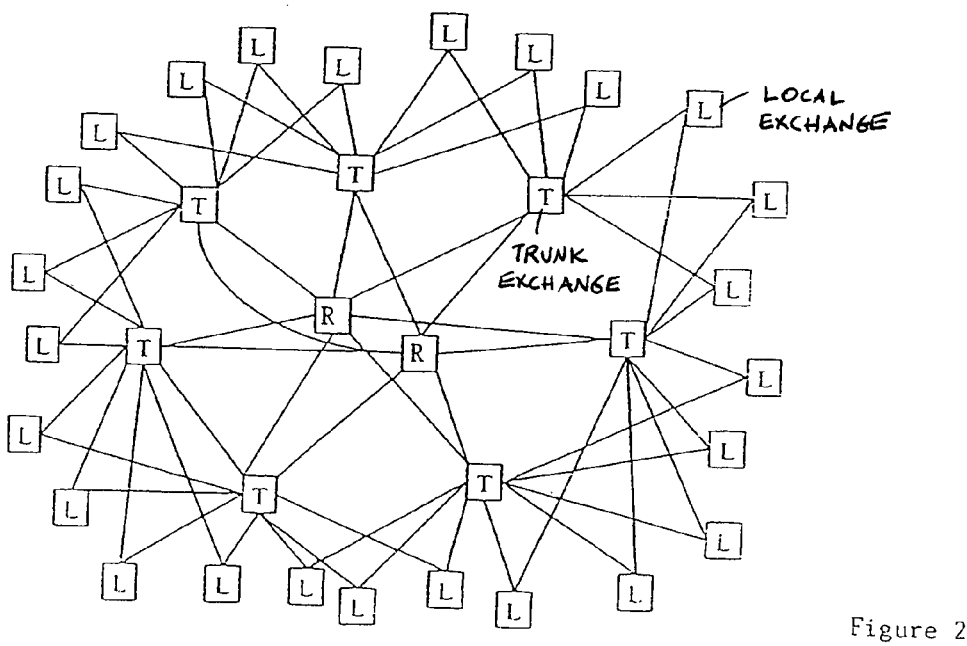
FIG. 2 shows the network of FIG. 1 with routers according to a first embodiment of the invention.

FIG. 2 shows the typical, large network of FIG. 1 after trunk upgrade according to a first embodiment of the invention. In this embodiment two routers R are shown, although the number may vary in practice. Each router R is connected to every trunk exchange T. Rather than a large number of low bandwidth connections, the trunk interconnect now consists of a few high bandwidth connections.

Figure 3:
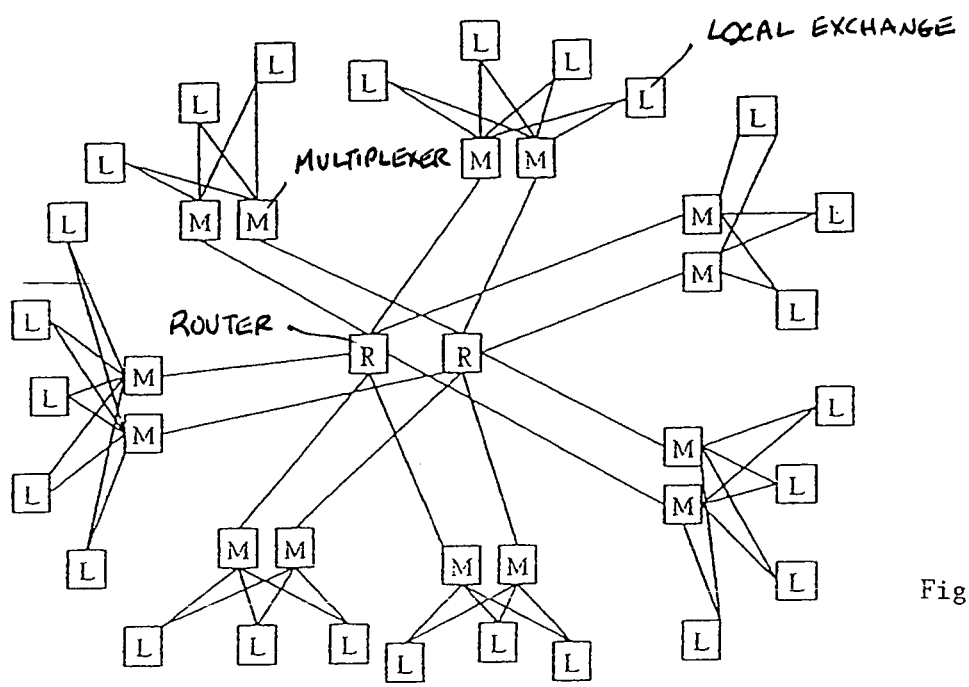
FIG. 3 shows the network of FIG. 1 with routers according to a second embodiment of the invention.

FIG. 3 shows the typical, large network after local upgrade. With the addition of some simple multiplexers M, all the local exchanges are directly connected to the routers R. The trunk exchanges (not shown) may still be used to provide regional interconnect and interconnection to non-upgraded exchanges and other networks.

Figure 4:
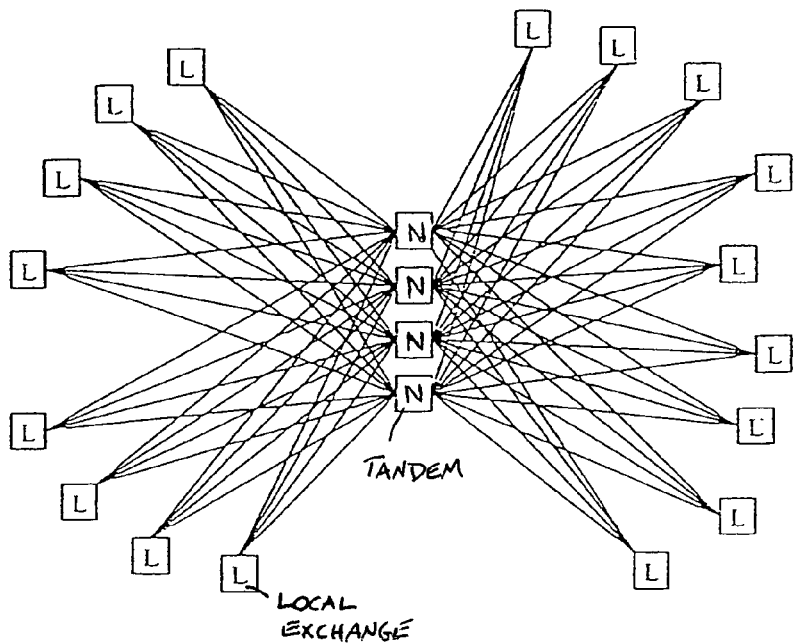
FIG. 4 shows in block diagram form a typical, conventional, small telecommunications network of the prior art.

FIG. 4 shows a typical smaller network. The smaller network has tandems N rather than trunk exchanges, which may have a few customers directly connected. Each local exchange L is connected to several (possibly all) tandems N, there is no interconnection of the tandems.

Figure 5:
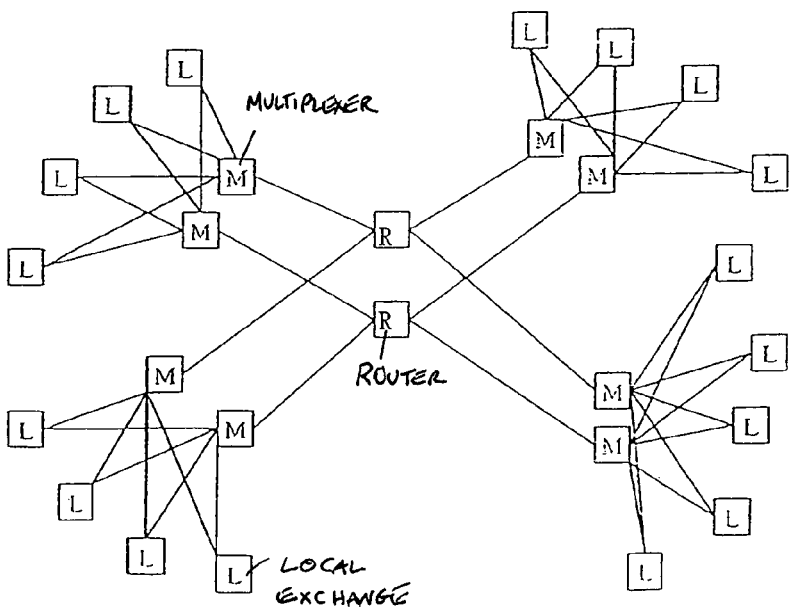
FIG. 5 shows the network of FIG. 4 with routers according to a third embodiment of the invention.

FIG. 5 shows the typical, smaller network of FIG. 4 after being upgraded according to a third embodiment of the invention. Routers R are installed, similar to those used to upgrade the large network, interconnecting the local exchanges L, through multiplexers M. The old tandems can then be reused, for example, as local exchanges and points of interconnect to other networks.

Figure 6:
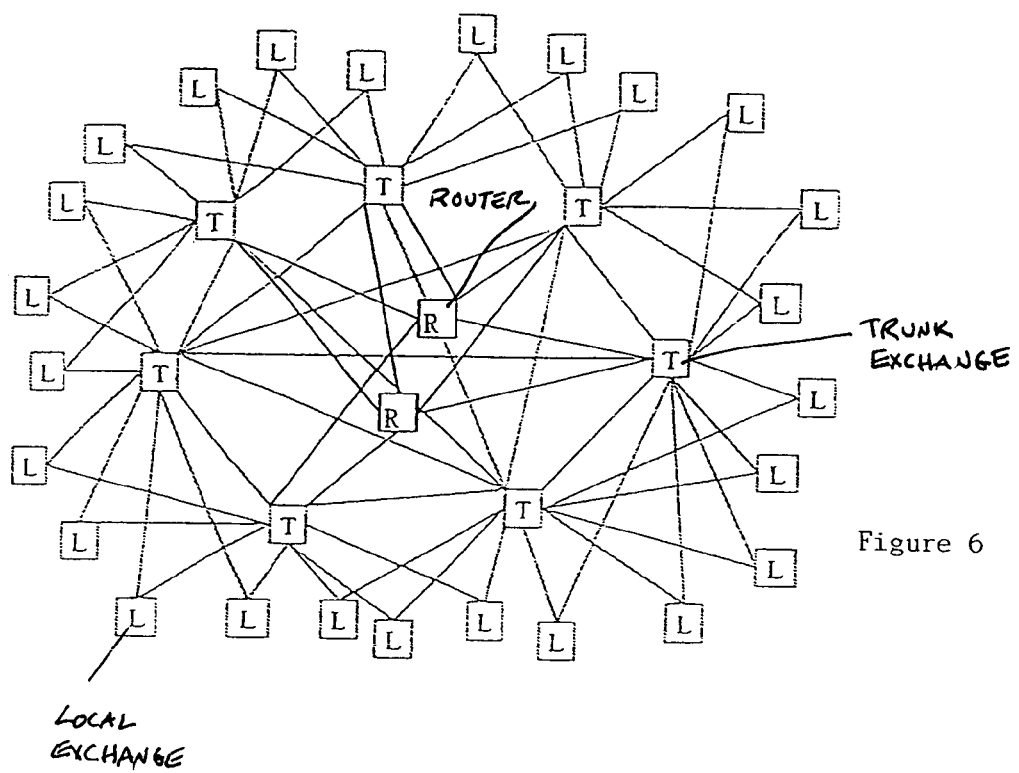
FIG. 6 shows the network of FIG. 1 partially upgraded with routers according to the first embodiment of the invention.

The routers R can be installed as a trunk network replacement piecemeal. FIG. 6 shows the large network of FIG. 1 partially upgraded. Here traffic is carried by a mixture of the old trunk interconnect and new routers R. A number of trunk exchanges T have connection to the routers R and are able to communicate with others so connected via the routers. However not all trunk exchanges T are connected to the routers R at this stage and the old trunk interconnect is still used for communication between exchanges not connected to the routers R and for communication between each such exchange and each of the exchanges connected to the routers R. The number of routers R can be upgraded from one to four or more as further exchanges are connected.

In this way the routers may be extended to eventually connect all existing trunk exchanges.

It may be desirable to move some of the existing transmission over to the router network, to take advantage of the greater efficiency of the routers R compared with the existing meshed PDH, and to overcome a shortage of physical ports on the conventional switches.

Each exchange requires routing data containing information on the way the exchanges are interconnected within the telecommunications system. Every time an exchange gets connected to the routers R, all the other exchanges that have already been connected to the routers will need to have new routes set up for communication with the newly connected exchange. Re-configuring exchanges in this way every time another exchange is connected via the routers is expensive. A preferred solution is for routing data relating to all exchanges to be loaded into each exchange as it is connected to the routers, but only to enable data relating to routes to those exchanges that have already been so connected.

Hence the implementation of the present invention simplifies the data requirements in exchanges. On installation, every exchange (trunk or local) can have exactly the same network data loaded. This data can be pre-prepared for the whole network with the data for the exchanges connected to the routers being enabled as the network is enhanced. This data includes the network part of the digit decode, which is needed to determine the exchange to handle the call, and the route to be used. The same route number can be used for all exchanges to get to the same far-end exchange. The digit decode requirements of the exchanges would grow to support routing to all local exchanges.

The existing trunk exchanges, could still be used, e.g., as regional trunk exchanges digital junction switching units (DJSUs), allowing reduction or elimination of sideways routes between local exchanges. If at any time these regional trunk exchanges are overloaded, the traffic can be handled in the main trunk (router) network.

Extension of the routers to directly interconnect local exchanges may be implemented once there is a sufficiently developed provision of trunk routers to provide the interworking.

When expanded to connect the local exchanges, enhancement may be necessary to carry the signalling directly over the IP connections. One way of interworking to local exchanges and other networks is to have simple interworking routers, which are effectively minimalist exchanges. These could be the existing trunk exchanges.

The adapters may use ATM, IP, or virtually any packet-based network. In many large-scale networks, IP is carried over ATM and a similar scheme could be used in the network of the invention. Alternatively IP could be carried over point-to-point protocol (PPP) over SDH or SONET, or any other appropriate interface. In the network of the invention, data is sent across the network to an address determined by the adapter. No call processing is necessary within the ATM, IP or equivalent packet networks. In effect the packet (e.g. ATM or IP) network forms a transport multiplex layer below that of the individual PSTN circuits. The packet (e.g. ATM or IP) network transport multiplex provides an alternative to the rigid PDH transmission network that is more flexible in the way it multiplexes channels. Conceptually the interconnected adapters may be thought of as providing an intermediate layer between the PSTN circuits on top and the transport multiplex underneath.

When operating over an IP network, the adapter could use the same AAL2 multiplex structure that it would use over ATM or it could use similar multiplex structures to those used by VoIP.

AAL2 has been designed to carry low rate, short length packets in delay sensitive applications in a bandwidth efficient way. The AAL2 multiplexes many separate low speed streams such as voice, data and signalling together on a single IP packet. AAL2 has been standardised in ITU-T I.363.2. AAL2 is an efficient way of multiplexing low-speed circuits together and is suitable for use over IP in the network of the present invention.

Voice traffic is given a high priority. This ensures that the delay variation would be well constrained, thus limiting the amount of additional buffering required to remove the effect of cell delay variation at the receiver.

The use of VoIP over ATM to provide the interconnection of adapters over the PTO network essentially uses a subset of the general VoIP transport as performed by any conventional VoIP gateway.

The proposed solution supports carrying voice as AAL1 or AAL2 in configurations to suit different networks at different stages of evolution.

Voice may be carried across the network of the present invention in more than one way. Where the adapters communicate using IP native-mode, voice may be packetised in a similar way to AAL2 for sending over the IP network, or packetised as voice over IP (VoIP). Voice over AAL2 may be implemented using the ITU-T I.366.2 "AAL type 2 service specific convergence sub-layer for trunking" speech multiplexing and encoding principles. This is efficient and supports transition to low bit-rate coding schemes, transcoding, etc.

Fundamentally the adapter working over IP (IP adapter) functions in exactly the same way as the adapter working over ATM (ATM adapter). As there is no call set up mechanism in the IP network, an adapter sending traffic over IP has to assume that the transmission capability it needs is always available. As with the ATM adapter, there is a need to ensure that the IP voice traffic is given a high enough priority to enable an adequate quality of service to be achieved. In order not to adversely affect the quality of service seen by the PSTN network, the IP network delay for voice traffic must be relatively low. This means that there must be a means to effectively prioritise voice traffic. The adapter needs to process voice traffic with a higher priority than data traffic in order to prevent unacceptable delay to voice traffic.

This may be achieved in a number of ways, for example if IP is carried via ATM where prioritising of voice traffic is supported. Operation over a private (totally-dedicated network) where voice traffic does not have to share the network with data traffic allows an adequate quality of service to be easily achieved by keeping delays to an acceptable level.

The invention may be implemented over IP native-mode which is capable of carrying some non-voice traffic but care is necessary to ensure that it does not affect the low delay requirements of the voice traffic.

In order to minimise delay when using IP, the length of IP packets carrying voice may be shortened. However, as each packet contains its own header bytes, this is wasteful of the network bandwidth due to the increased proportion of header information to useful data sent. Advantageously a number of different circuits may be multiplexed into a single, large packet. In this way delay is still reduced without increasing the proportion of header information to data sent.

Use of AAL2 carrying a number of different channels multiplexed together can provide low delay (as in the case of short packets) without excessive amounts of header information.

A single network according to the present invention could use ATM to provide traffic to a first destination whilst at the same time using IP over ATM to provide traffic to a different destination. Hence PSTN circuits could be carried across the PTO network using either ATM or IP over ATM on a route by route basis. In doing this a relationship is set up between individual PSTN circuits and routes across the PTO network.

Telephone calls include traditional hand-set to hand-set calls but also calls initiated or answered by machine including computers. Such calls may contain voice and/or data from e.g. modems or facsimile equipment. Handling of such calls include call set-up, routing and clear-down. No call handling is required in the central routers. All the call handling is handled in the PSTN, using existing protocols with all the existing features.

To achieve network resilience in the presence of equipment failure, it is desirable to have at least two, and preferably more central nodes so that if one node fails the network would still be able to work via the other nodes. Here the term "node" is used to indicate a cross-connect, router, or other suitable packet-based switch. In an IP based network this would require a plurality of truly independent IP routers which were geographically separated and independently controlled and managed. They would also need to be resilient against unauthorised intrusion and hacking.

Between each pair of exchanges in an IP based PTO network, a Logical Route would be established, that corresponds to all the active calls between that pair of exchanges. This Logical Route is dynamic in nature and the bandwidth of the Logical Route changes to match the changing demand as existing calls terminate and new calls start.

In a preferred embodiment of the present invention, each trunk/local exchange has an STM1 (155 M) connection to each router, carrying one Logical Route per destination exchange. For most local exchanges these 155 M connections can be shared between several exchanges, as detailed below. The Logical Route can grow or shrink as necessary: the total quantity of traffic is only limited by the capacity of the transmission to carry it. As traffic patterns change, Logical Routes may grow or shrink on a dynamic basis: no configuration is necessary.

The exchanges communicate using existing SS7 protocols, however there is an option (that is necessary when it is extended to local exchanges) to carry the MTP layer 3 over the Logical Route that connects each exchange, thus eliminating the need for any other signalling hardware.

Further bandwidth savings may be achieved if only active PSTN circuits (i.e. those carrying information) are packetised. This requires a busy/idle timeslot map to be carried in an end to end control channel using spare capacity within the IP Logical Routes. This technique allows the mapping to be changed dynamically and in a similar way to that set out in detail in patent number GB 2276518 in the name of GPT Limited. Optional echo cancellation may also be provided.

Optional signalling transfer point (STP) function to handle SS7 signalling may be provided. This feature will extract redundant data (Level 2 interframe fill) from the SS7 signalling stream.

Optional modem (fax) detection may be provided. Low speed modems are not bandwidth efficient. In particular, many connections, e.g. fax calls, are essentially unidirectional. This optional feature will detect such calls and convert the modem signals to baseband data for packetisation into IP, taking advantage of the fact that communication across IP can be asymmetric. Thus further bandwidth savings can be achieved.

Although this has been described in relation to improved trunk networks, the present invention could also be deployed into many other fields for both public and private networks.

Similarly the present invention has application to leased lines within public networks. Leased lines are often under-utilised, resulting in idle timeslots being carried across the network. The use of the present invention, will allow the network operator to only transport the active channels without degrading the service presented to the end user.

The present invention provides for straightforward enhancement to support traffic growth wherein the majority of the routing data needed by the PTO exchanges is identical. This allows operators to add to and evolve current networks as and when enhancements to performance or capacity are required.

Figure 7:
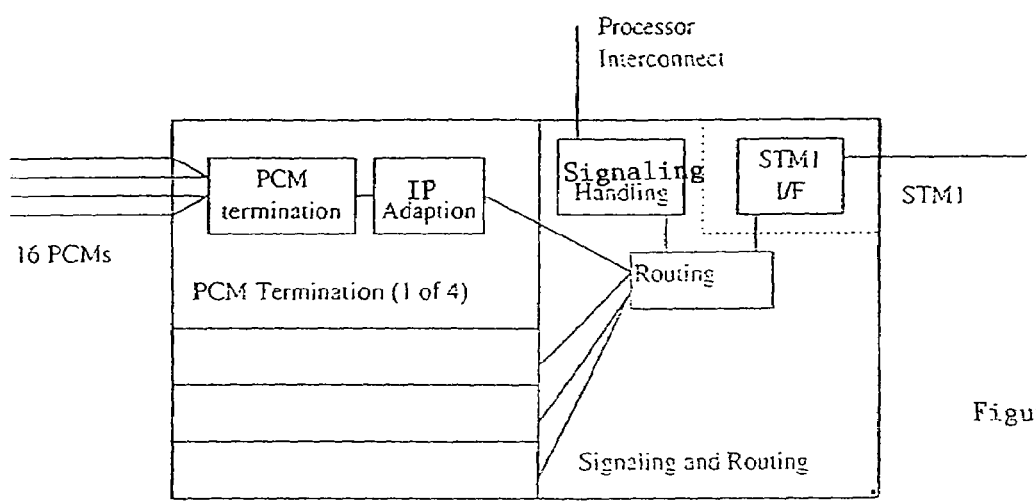
FIG. 7 shows in block diagram form an adapter according to the present invention.

For interfacing with sources of non-packetised traffic an adapter is provided, see FIG. 7. The adapter functions to convert traffic for sending to the routers into packets and to re-convert packets received from the routers to un-packetised form. In one embodiment the adapter provides interworking between a PSTN trunk (G.703/G.704) and an IP domain to allow IP to be used to provide an efficient and flexible interconnect between exchanges by using variable bandwidth Logical Routes.

For interfacing with STM networks, the adapter provides interworking between IP and STM, with preferably one adapter for each route via the routers. These adapters perform interworking between 2 M bit/s PCM traffic and IP and also provide a means to connect signalling directly with each of the other local exchanges. These adapters communicate with each of the processor clusters as most of the signalling traffic passes through them.

Figure 8:
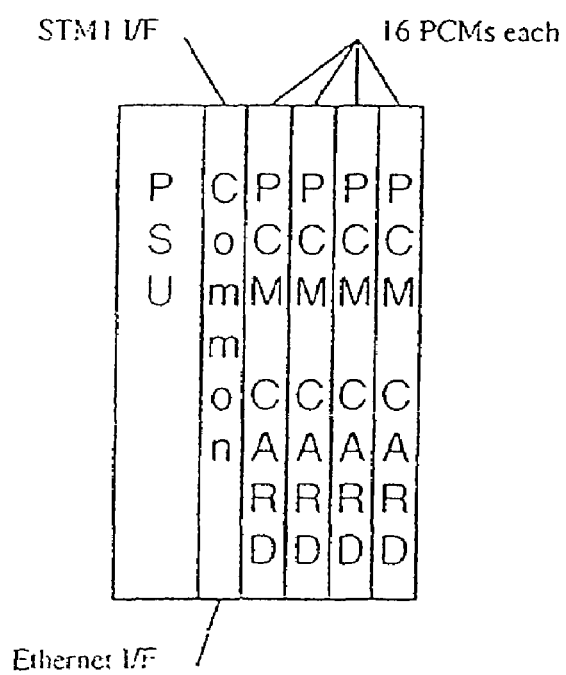
FIG. 8 shows a possible internal organisation of the adapter of FIG. 7.

We now consider the adapter construction in more detail. Referring to FIG. 8 by way of example, each adapter unit comprises a housing with a PSU, a common card and up to 4 PCM cards, although more could be added. Each PCM card could handle up to 16 PCMs, the common card has an STM1 interface, an Ethernet interface and a controller for the PCM cards. Each exchange could typically need 4 adapters in this embodiment and these could preferably be mounted two per shelf of the exchange.

The routers operate under PSTN control and provide no control processing themselves. Advantageously a small number of cross links are provided between the main routers, to provide some flexibility after major transmission network outages. These would only be brought into use when a pair of local exchanges have no common accessible trunk routers (a very rare occurrence).

To control the routing and use of circuits, the exchange's call processing system (CPS), sends mapping information to the adapter function at the start and end of each call. At the start of each call, the mapping message gives the association between the PCM circuit and the PSTN side with the route and circuit on the logical side. For ATM based PTO the route would be a VP or a VC, for IP based PTO the route would be the Logical Route to the destination exchange, the mapping message may also indicate the type of call, so that appropriate compression can be used. At the end of the call the CPS function will send another message to cancel the mapping function.

A processor interconnect handles the signalling traffic, the mapping messages from CPS and general management. A suitable interface to use here is Ethernet as it allows the interface to be fairly open for use on other platforms if necessary.

The hardware of the PCM termination could support both E1 and T1 or be dedicated to either data rate.

The adapters also exchange status information with each other to ensure that each is operational and to exchange and pass on traffic-blocking information. Periodically and when necessary (for example because of a status change) each adapter should send a cell to each far end adapter. This cell contains three elements:

1. The adapter receiver status (i.e. whether the adapter is happy with what it is receiving from the far end adapters);
2. A hold indication that, if set, should cause the far end adapter to stop the flow of new traffic to that adapter;
3. Status information on the PCMs to the exchange (i.e. reflecting which PCM/circuits can be used).

When an adapter receives a check cell, it reacts as follows:
1. If the far end is not happy, it should force clear all calls and hold that route busy (but still send its own check cells);
2. If the far end requests a hold, send a hold to the associated exchange;
3. If the far end ceases to request a hold clear the condition (the adapter may delay reacting to a change of state to prevent the network oscillating);
4. If the far end has PCM failures, reflect these on to the alarm indication signal (AIS) of its transmitted PCMs.

The Control protocol between the call processing and the adapter units is implemented as an application programming interface (API). This API covers the setting up and breaking down of switching associations, and optionally management (e.g. failure and configuration management).

Management of the adapter includes managing the equipment, configuring it and handling any appropriate statistics. Management is preferably achieved through the exchange or, when the adapter is being used as a standalone device, a Simple Network Management Protocol (SNMP) interface would be appropriate for it to be managed by third party management systems. Alternatively a standalone adapter could be managed through the SDH, for example by using the Equipment Management Operations System (EMOS) particularly when the adapter is closely associated with transmission equipment. Thus, depending on where and how the adapter is being used, different management solutions are necessary.

When the adapter is being used as standalone equipment, a SNMP management interface over the Ethernet control port will be appropriate. This will be controlled by a Managed Information Base (MIB) which should be published. The data model necessary for these applications may differ significantly depending upon the type of exchange used. Flexibility is essential to allow for the addition of functionality such as transcoding, packing algorithms and data rate change. When the adapter is deployed along with SDH transmission, it may be appropriate to manage it through EMOS and the rest of the SDH. This could be through an Ethernet port, through the DCC of the STM1, or through the IP.

In principle all the traffic could be handled by a single router, but this is likely to be unacceptable in practice for availability reasons.

There will preferably be at least two routers to allow for catastrophic failure. However even with two it will be necessary to have a very high level of redundancy with alternative routing for the transmission to these routers. With four routers there is a good level of built-in network redundancy, without the cost being too high. Each should preferably be dimensioned such that any two could handle the normal peak traffic loads of the entire network.

For maximum availability suitably diversely routed transmission should be arranged to the routers with each router on an independent site.

The basic architecture would work with any of the following combinations:

Two routers connected over two diverse routes and using transmission protection; three routers over two diverse routes using transmission protection or three routers with three diverse routes without transmission protection. Four routers over two diverse routes without using transmission protection; four routers over two diverse routes using transmission protection and six routers connected via two to three diverse routes without transmission protection. Obviously the numbers above could be varied by the skilled worker depending on the requirements concerning resilience to failure and cost.

Each adapter would need at least one IP address for routing traffic across the network. Each adapter may have additional addresses for other purposes.

The arrangement described above, using IP, can bring benefits in the form of transmission saving, a dynamic network, data simplification and switch port saving.

Transmission saving results from the use of large units (e.g STM1 rather than 2 Mbit/s such as VC12) which only has to be routed to a far-end adapter via one of the central nodes (e.g. ATM cross-connect or IP router). In many cases these large transmission units may be part empty thus allowing lower priority data services to be carried. This results in a much more efficient use of transmission than in traditional, directly-connected networks.

By dynamic network is meant that traffic patterns can change on a rapid (e.g. minute-by-minute) basis without the need for complex load balancing or for guessing future traffic loads on particular routes. This renders the network efficient and easy to manage.

Data simplification results from being able to use the same routing and network data in all exchanges. This data is also simpler, reflecting the simpler structure of the PTO network.

The number of switch ports required in exchanges can be reduced due to the removal of the physical mesh interconnection.

I claim:

1. A telecommunications system, comprising: one or more nodes; a plurality of telephone exchanges, two of which are arranged to communicate traffic with each other via the one or more nodes; wherein communication via the one or more nodes is in a packetized form of packets; wherein the one or more nodes comprise routers; wherein at least some of the telephone exchanges arranged to communicate with each other via the one or more nodes are trunk exchanges; wherein each of the trunk exchanges has a direct link to each of the one or more nodes; wherein communication via one or more of the routers uses internet protocol (IP) for the traffic; and an adapter for exchanging status information in a packetized form, said status information at least including traffic-blocking information to allow the flow of new traffic to the adapter to be stopped, the adapter also including means for converting the traffic from the packetized form to a non-packetized form.

2. The telecommunications system of claim 1, wherein at least some of the telephone exchanges arranged to communicate with each other via the one or more nodes are local exchanges.

3. The telecommunications system of claim 1, wherein the communication includes telephone calls; and wherein all call handling in the system takes place outside of the one or more nodes.

4. The telecommunications system of claim 2, wherein communication between the local exchanges and the trunk exchanges uses asynchronous transfer mode (ATM).

5. The telecommunications system of claim 1, wherein each of the two or more telephone exchanges comprises routing data relating to communication with all other exchanges in the telecommunications system; and wherein the routing data is partially or wholly enabled.

6. The telecommunication system of claim 5, wherein only that part of the routing data in a particular exchange relating to communication between that exchange and other exchanges with which that exchange is arranged to communicate via the one or more nodes is enabled.

7. The telecommunications system of claim 1, comprising means for carrying voice traffic as asynchronous transfer mode (ATM) Adaptation Layer 1 (AAL1) or ATM Adaptation Layer 2 (AAL2).

8. The telecommunications system of claim 1, comprising means for carrying voice traffic as voice over IP (VoIP).

9. The telecommunications system of claim 1, wherein the adapter includes means for providing interworking between synchronous transfer mode (STM) and IP domains.

10. The telecommunications system of claim 9, wherein the adapter includes means for detection of modem traffic.

11. The telecommunications system of claim 10, wherein the adapter includes means for converting a detected modem signal to baseband data for packetization into IP.

12. The telecommunications system of claim 1, wherein the traffic to be packetized comprises public switched telephone network (PSTN) circuits, and wherein the adapter is arranged to only packetize active PSTN circuits.

13. The telecommunications system of claim 12, wherein the adapter includes means to communicate information on which PSTN circuits are not packetized using spare capacity within an IP logical route.

14. The telecommunications system of claim 1, wherein the adapter includes means for compression of voice traffic.

* * * * *